March 24, 1931. C. ASCHENBRENNER 1,797,849
MULTIPLE CHAMBER FOR TAKING PHOTOGRAPHS FROM AEROPLANES
Filed Dec. 5, 1927
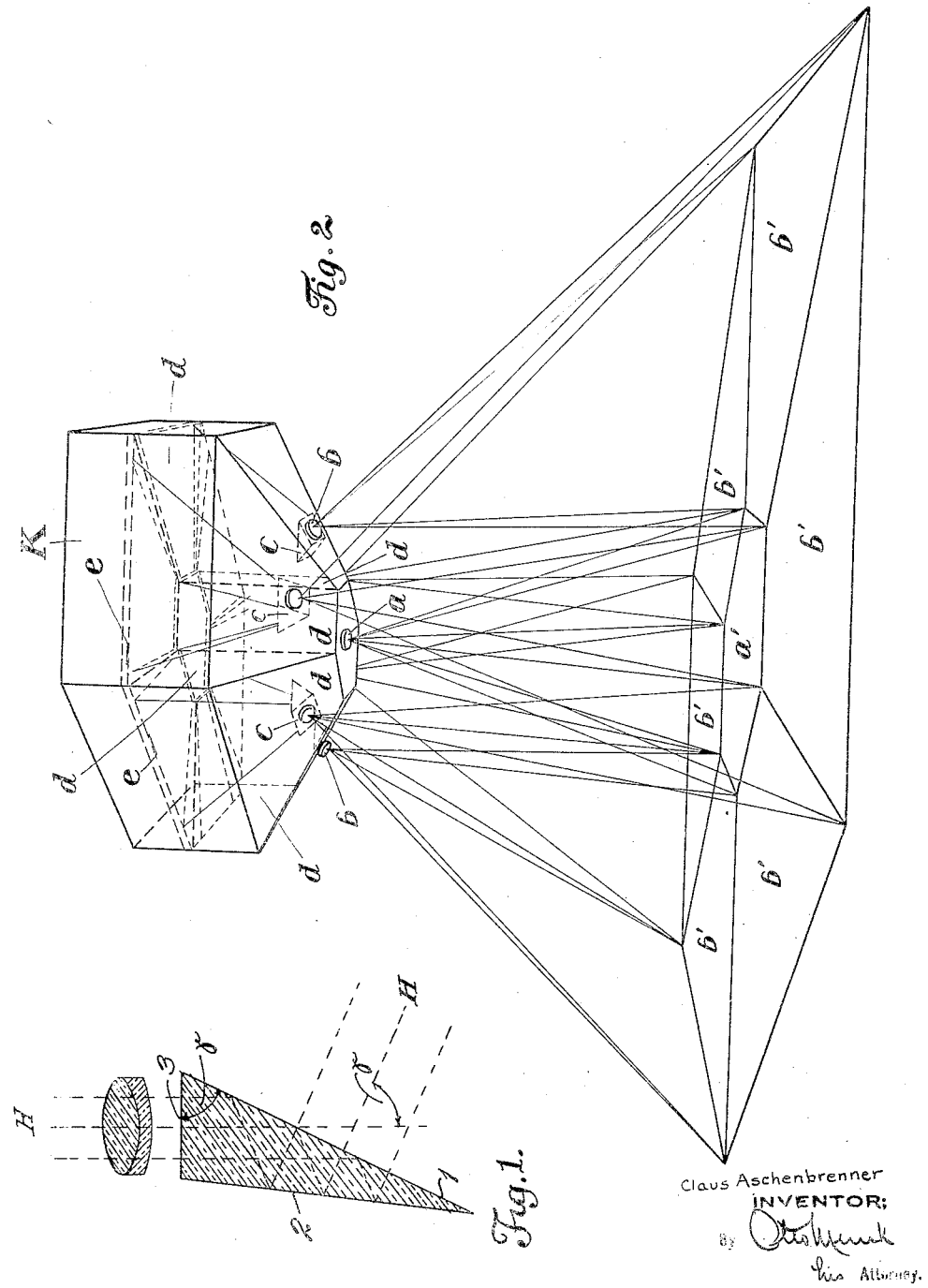

Patented Mar. 24, 1931

1,797,849

UNITED STATES PATENT OFFICE

CLAUS ASCHENBRENNER, OF MUNICH, GERMANY, ASSIGNOR TO THE FIRM PHOTOGRAMMETRIE G. M. B. H., OF MUNICH, BAVARIA, GERMANY

MULTIPLE CHAMBER FOR TAKING PHOTOGRAPHS FROM AEROPLANES

Application filed December 5, 1927, Serial No. 237,700, and in Germany December 16, 1926.

My invention relates to multiple cameras for taking pictures of the ground from aircraft.

In photogrammetry from aircraft, it is of importance to include as large a ground area as possible in a single exposure, so that not only the very extensive view obtainable from an aircraft while aloft, may be adequately availed of, but that also as many areas or sections as possible may be corelated in perspective by simultaneous photographic reproduction in order to reduce to a minimum, the subsequent work of orientation in the production of a cartographic picture of any kind.

The present state of development of the optic art permits of utilizing but a fraction of the view from an airship, with the use of a single objective. In an effort to overcome this limitation, mechanism was devised which included several cameras whose relative orientation was known or predetermined and by means of which, several pictures were taken simultaneously in different directions, thus providing pictures of a greater area in perspective corelation than was possible with the single objective cameras. Multiple cameras of this kind are of two types, viz:—

1. The first type includes cameras which take pictures of one or more unknown areas in combination with one or more known areas, so that on the basis of the known area or areas the unknown area or areas may be oriented, and a proper knowledge of the entire area thus obtained. In devices of this type, it is not essential to the object in view that the areas photographed separately follow one another without break of continuity on the film or plate, because it is simply a matter of transferring and corelating the orienting elements or parts.

2. The second type includes devices, the primary purpose of which is to simultaneously take a number of photographs of as large an area as possible and have the reproductions shown no break of continuity between the several pictures. It is essential in this class of work that the several pictures taken by a multiple camera during one exposure shall follow one another without break of continuity. By rectifying a photographic group of this kind to a suitable central direction of exposure, e. g., in the direction of exposure of the middle objective, a coherent, self-contained, gapless image without introverting corners results, after the manner of a wide angled exposure with a single objective, such image having all the perspective characteristics of such wide angled exposure. This type, whose aim is to comprehend as great an area as possible, is characterized by the individual exposures being symmetrical to the vertical, so that a middle picture of the form of a regular polygon and taken with a substantially vertical direction of exposure is so surrounded by sector shaped lateral pictures taken with inclined exposures that after a projective reformation (rectification) of the lateral pictures to the focal distance and exposure direction of the middle picture a gapless juxtaposition of the several pictures into a single picture is possible, such single picture then presenting the properties of a single exposure with a wide angled objective of the same focal distance.

The present invention relates to multiple cameras of the second type, and is illustrated in the accompanying drawing, in which, Figure 1 is a sectional view on an enlarged scale of a lens and prism associated therewith, and Figure 2 is a perspective view of a camera embodying the invention.

In prior art devices of this kind, the focal planes of the individual objectives lie in the planes of a polyhedron, and as the production of polyhedrous pictures is not feasible practically, and their use in the succeeding rectification would involve considerable difficulties, each polyhedron plane (focal or picture plane) must be replaced by a plane plate or film not rigidly connected with the remaining focal planes. This results in the loss of an important advantage of this construction, viz: the immediate juxtaposition of the individual pictures which can only be subsequently achieved with the aid of justifying means for each separate picture. Moreover, the shortness of time available in an airship presents a practically insurmountable difficulty to changing plates or films between two successive exposures.

The object of the present invention is to obviate these difficulties inhering in existing devices and this object is accomplished by interposing special trilateral prisms each having two reflecting surfaces in the path of the rays of the objectives forming the sector shaped lateral pictures, whose focal planes coincide in the focal plane of the single middle picture. In this manner, the several exposures can be made on a single plane plate or film, thus always remaining properly coordinated and also enabling the change of photographic material (plate or the like) for the several pictures to be effected by changing but a single plate or film. The interposition of prisms each with two reflecting surfaces is necessary in order that the lateral pictures may not be reversed, as would be done with a mirror.

I am aware that refracting means have heretofore been used in connection with multiple cameras of the first type, above referred to. In these prior devices, however, either simple mirrors or trilateral prisms with but a single reflecting surface were used, and these did not produce laterally rectified pictures; and in some instances a plurality of mirrors or prisms, or prisms with more than three sides were used, but none of these devices gave the results produced by the present invention.

Referring to the drawing, and particularly to Figure 2, K denotes a multiple camera having fixed therein the middle objective $a$, six lateral objectives $b$ and a trilateral prism $c$ with two reflecting surfaces interposed in the path of the rays to each objective $b$. The camera K is light proof and is divided by partitions $d$ into a plurality of separate chambers. The focal plane of the several objectives is in the plane of the light sensitive layer $e$. By simultaneous operation of the shutters of the seven objectives, an exposure without interruption of continuity is obtained of the contiguous sections $a'$ and $b'$ of the area being photographed.

Figure 1 shows one of the prisms $c$ with the corresponding lens, both on an enlarged scale, but in this figure, the prism is in front of the lens while in Figure 2, the prisms are in the rear of the lenses.

The rays coming from the object pass unobstructedly through the surface 1 opposite the obtuse angle of the trilateral prism. After passing through the surface 1 these rays are for the first time reflected by the smaller of the two acute angles of the surface 2. In their further travel the rays encounter the surface 1 a second time being totally reflected thereby, so that the rays are thus subjected to a second reflection. After this second reflection by the surface 1 they issue through the surface 3 and reach the objective whose optical axis is approximately perpendicular to the surface 3. The several rays issue from the surface 3 at the same angle at which they entered the surface 1 so that no color diffusion occurs. The angle $\gamma$ by which the main ray H—H was deflected from its original direction is the same as the larger of the two acute angles of the prism; it is less than 90° and thus fulfills the conditions defined above for the uninterrupted contiguity of the several pictures.

I claim:

1. A multiple camera, comprising a central objective, a plurality of lateral objectives encircling the central objective, a trilateral prism associated with each lateral objective and provided with two (adjacent) reflecting surfaces, the surface thereof through which the light rays enter being inclined towards the axis of the central objective, and a common sensitive film carrier disposed in the focal plane of the several objectives to obtain an exposure without interruption of continuity of the contiguous sections of the area being photographed through said several objectives.

2. A multiple camera, as claimed in claim 1, in which the acute angle of the prism at the side of the objective and opposite the first reflecting surface is double the acute angle opposite the objective side and between the first and second reflecting surfaces.

3. In a multiple camera, the combination of a central objective, a plurality of lateral objectives arranged in a circle with the symmetry axis of the central objective as a center, a tri-lateral prism associated with each lateral objective, each prism being an obtuse-angled triangle having its acute angle at the objective side double that of the acute angle opposite the objective side and the side opposite the third angle being inclined towards a point in the symmetry axis of the central objective, whereby light rays from the object being photographed are twice reflected in the prism and transmitted to form an entire image by a gapless juxtaposition of the several images around the central image.

In testimony whereof I hereunto affix my signature.

CLAUS ASCHENBRENNER.